Patented Oct. 24, 1933

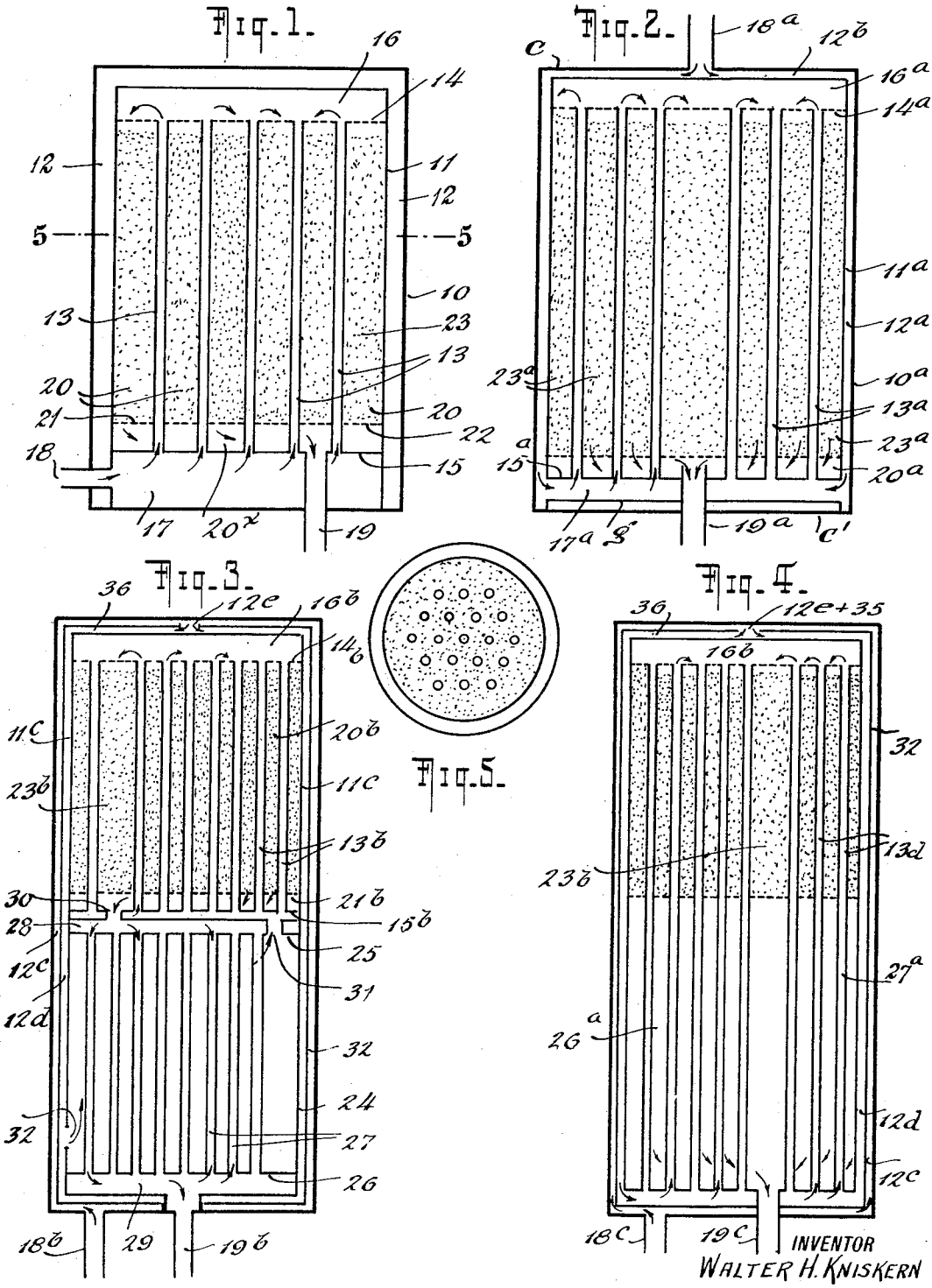

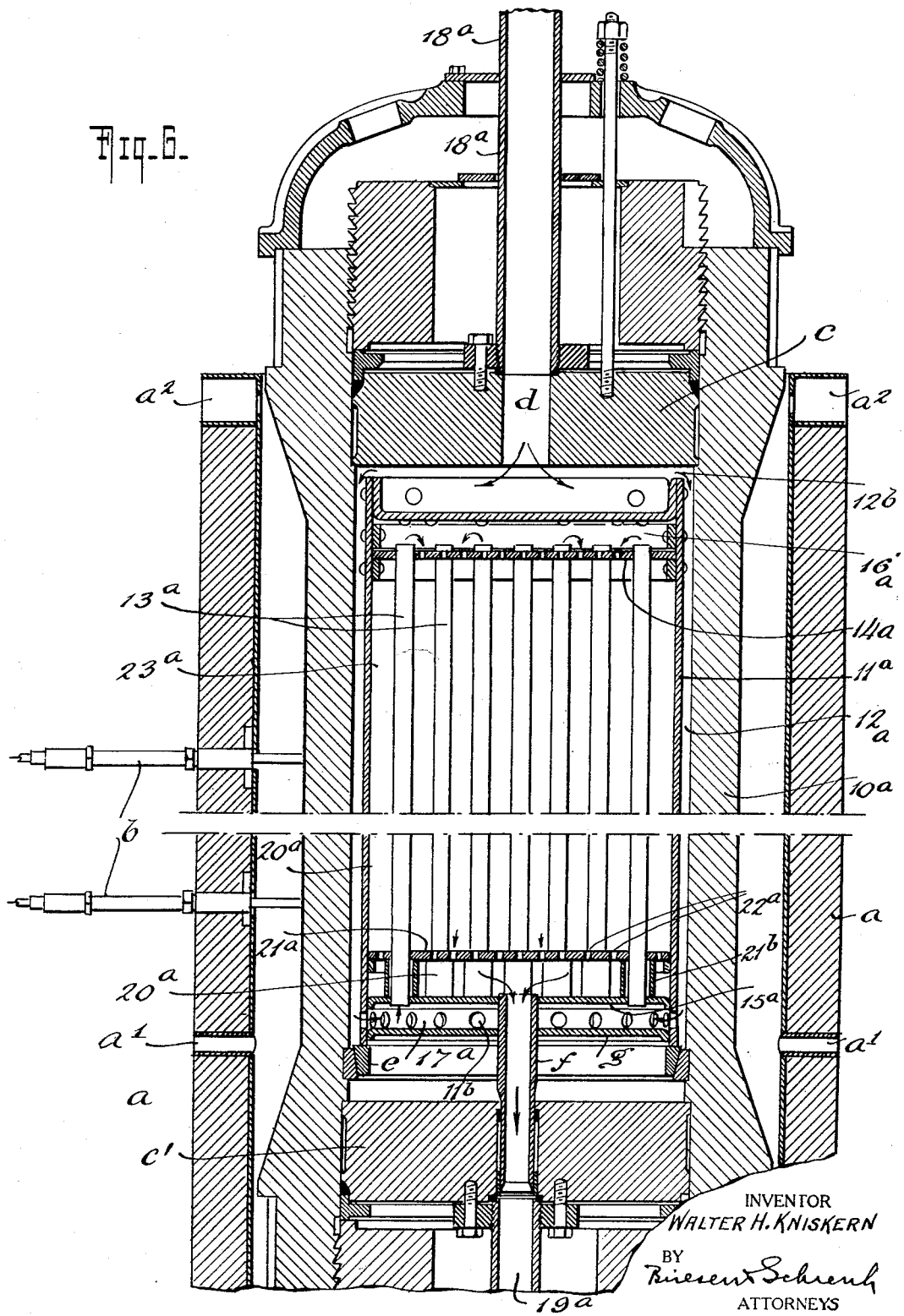

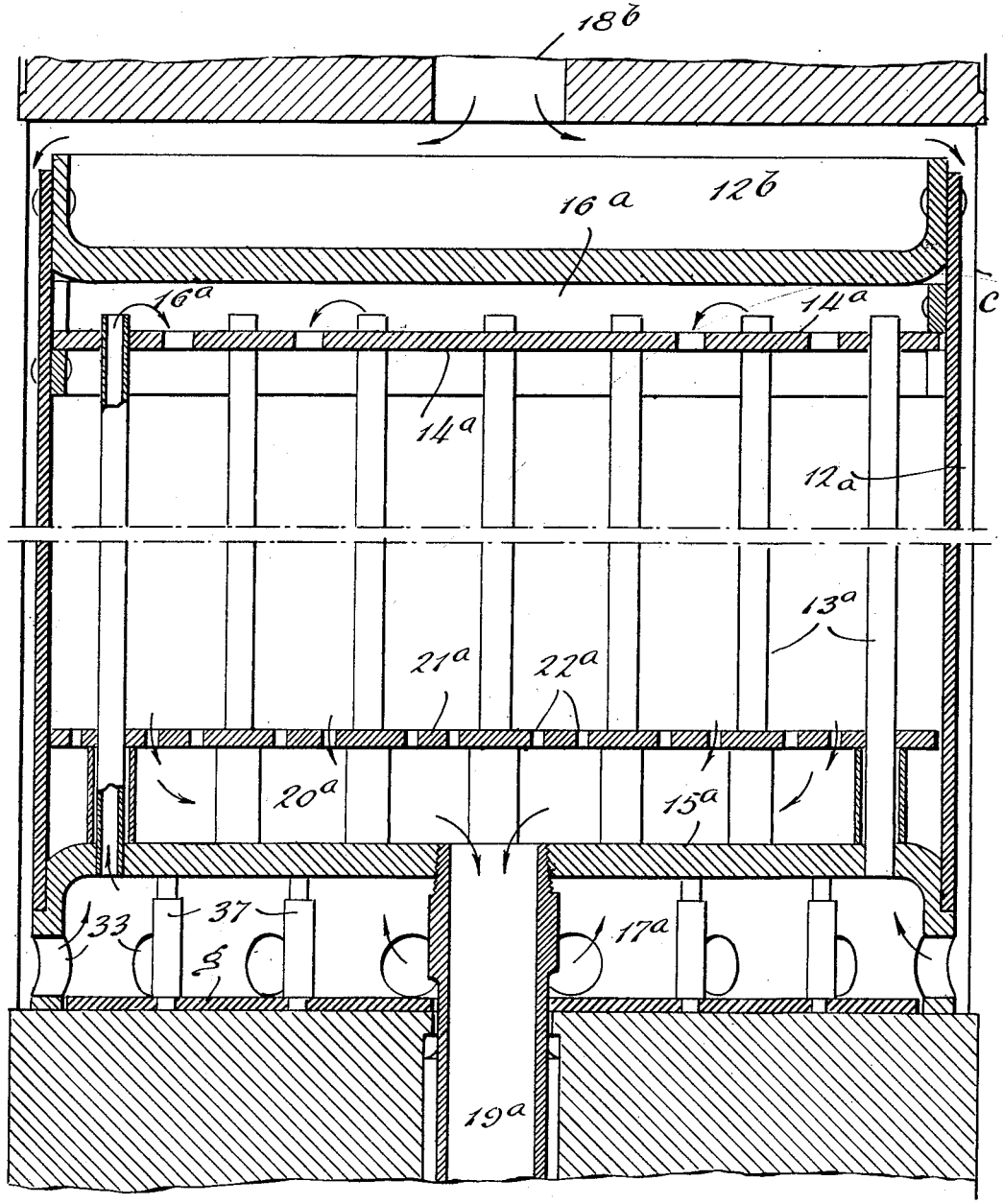

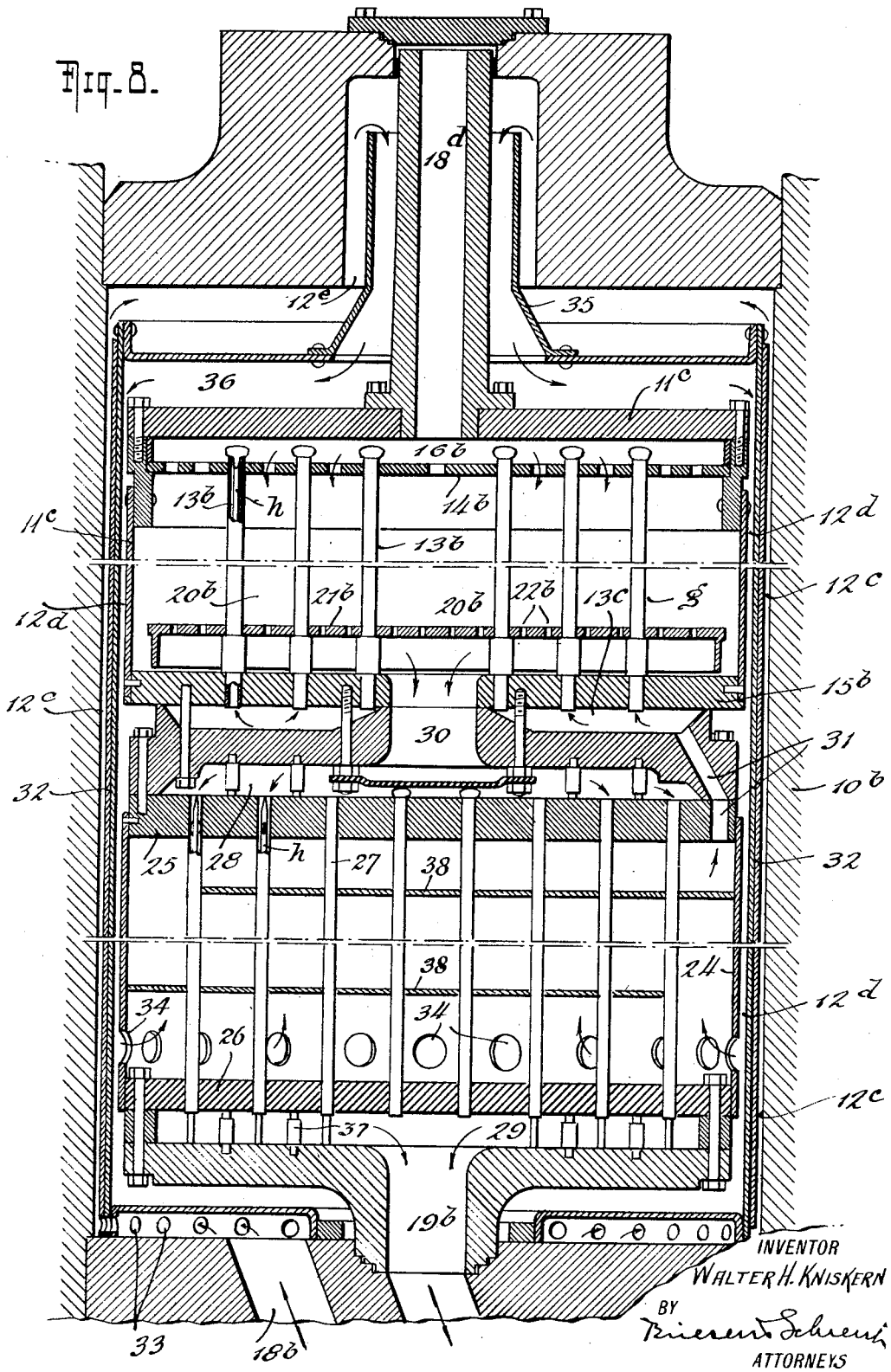

1,932,247

UNITED STATES PATENT OFFICE 1,932,247

METHOD AND APPARATUS FOR THE CARRYING OUT OF CATALYTIC REACTIONS

Walter H. Kniskern, Syracuse, N. Y., assignor to Atmospheric Nitrogen Corporation, Solvay, N. Y., a corporation of New York Application September 1, 1923
Serial No. 660,532

9 Claims. (Cl. 23—289)

The invention relates primarily to exothermic catalytic reactions which involve temperature regulation and of the character illustrated by the synthetic production of ammonia where the invention has for its object to increase the ammonia output to a maximum point wherein also the heat transfer efficiency is highly developed so that the increased evolution of heat due to the increased output is prevented from producing an injuriously high temperature but is at the same time removed and utilized. The invention further contemplates a novel apparatus for carrying out the method and constructed in a manner to permit an increased charge of catalyst and so that the temperature conditions can be regulated and the desired temperatures throughout the apparatus obtained and maintained. Other more specific objects of the invention will appear from the description hereinafter.

In the accompanying drawings which illustrate an example of the invention without defining its limits, Figs. 1, 2, 3 and 4 are diagrammatic sectional elevations illustrating the apparatus in several forms; Fig. 5 is a diagrammatic horizontal section on the line 5—5 on Fig. 1; Fig. 6 is a sectional elevation on an enlarged scale showing the apparatus illustrated diagrammatically in Fig. 2; Fig. 7 is a variation in detail of the lower part of Fig. 6 and Fig. 8 is a similar view to Fig. 7 illustrating the apparatus shown diagrammatically in Fig. 3.

In the form diagrammatically illustrated in Figs. 1 and 5 the apparatus comprises a suitable chamber or converter 10 constituting a pressure sustaining vessel within which a closed shell 11 is located, the arrangement and dimensions of the parts being such that a closed space or passage 12 is formed between said shell and the converter. In other words, the pressure sustaining wall 10 is not in contact with the active portions of the catalytic material 23. A plurality of tubes 13 of heat transmitting material are provided within the shell 11 in spaced relation and have their opposite ends fixed respectively in heads 14 and 15 secured within said shell at a distance from the opposite ends thereof to form chambers 16 and 17. A gas inlet pipe 18 passes through the converter 10 into communication with the chamber 17 of the shell 11 while an outlet pipe 19 communicates with the spaces 20 between the tubes 13 and extends outwardly beyond the converter 10; the pipes 18 and 19 both pass through the space 12 without, however, having any open communication therewith. At a distance above the head 15 the shell 11 is provided with a carrier 21 having perforations 22 and arranged to support a suitable ammonia catalyst 23 located in the spaces 20 between the tubes 13 and surrounding the same so that said tubes are completely embedded in said catalyst.

The method of producing ammonia in which this form of apparatus may be utilized consists in passing the incoming gas from the inlet pipe 18 into the chamber 17 and upwardly through the tubes 13 to the chamber 16; from the latter the gas passes downwardly through the catalyst 23 in the spaces 20 between the tubes 13, through the perforated carrier 21 and into the space $20x$. The gases converted by this process, together with the gases which remain unaffected by the catalyst, pass out of the apparatus from the space $20x$ through the outlet pipe 19 for further treatment in the synthetic production of ammonia.

In the form illustrated in Figs. 2 and 6 the apparatus comprises a chamber or converter $10a$ of suitable construction and dimensions and which may be surrounded at a distance by suitable insulation $a$ provided with the required number of pyrometers $b$ for measuring the wall temperature of the converter. Air apertures $a^1$, $a^2$, may be provided in the insulated shell $a$ and by regulation of the amount of air admitted or blown in at say the lower set $a^1$ the wall temperature in $10a$ may be held down or decreased whenever desired. The converter is provided at one end with a head $c$ having an inlet $d$ connected by means of an inlet pipe $18a$ with a source of synthesis gas and at its other end has a head $c'$ carrying an outlet pipe $19a$. A closed shell $11a$ is located within the converter $10a$ and rests upon an annular carrier $e$ therein, the arrangement and dimensions of the parts being such that the shell $11a$, as we as its opposite ends, are spaced from the converter to provide an interior annular passage or space $12a$ and a communicating end chamber $12b$, it being understood that the annular space $12a$ is closed at its lower end by the annular carrier $e$ as shown in Fig. 6. As indicated in Fig. 7, the bottom plate $g$ or the lower edge of the shell $11a$ may rest directly upon the head $c'$, omitting the carrier $e$ and dispensing with the space between $g$ and $c'$. In fact the plate $g$ may be dispensed with altogether, although for structural purposes it will probably be used in most cases. A plurality of tubes $13a$ are located in spaced arrangement within the shell $11a$ and have their opposite ends fixed respectively in heads $14a$ and $15a$ secured within the shell $11a$ at a distance from the ends thereof to form chambers 16a and 17a as shown in Fig. 6. The connection between the tubes and the head 15a is gas-tight, whereas at 14a the fit may be loose and thus function as a perforation. This is true for all the figures of the drawings. An outlet tube f is secured in the head 15a in communication with the spaces 20a between the tubes 13a and passes out through the lower end of the shell 11a into connection with the gas outlet pipe 19a; the shell 11a is provided with a plurality of perforations 11b so located as to establish communication between the annular space 12a and the chamber 17a of the shell 11a. At a distance above the head 15a the shell is provided with a carrier 21a provided with perforations 22a and supported by means of tubular spacers 21b which, as shown, may surround the lower ends of the tubes 13a. A suitable ammonia catalyst 23a rests upon the carrier 21a and fills the spaces 20a between the tubes 13a so that the latter are completely surrounded by and embedded in said catalyst 23a in the same way as shown diagrammatically in Fig. 5.

The method of producing ammonia, in which the apparatus shown diagrammatically in Fig. 2 and more completely in Fig. 6 may be utilized, consists in passing the synthesis gas which enters through the inlet pipe 18a downwardly in the passage or space 12a by way of the chamber 12b and upwardly in the tubes 13a, by way of the perforations 11b and chamber 17a; the gas, after passing upwardly in said tubes 13a, leaves the same and enters the chamber 16a within the shell 11a and then flows downwardly in the spaces 20a between the tubes 13a and through the catalyst 23a contained in said spaces 20a. Thus with this method all of the synthesis gas first passes downwardly through the space 12a in contact with the inner and outer surfaces of the converter and shell respectively before it flows upwardly in the tubes 13a and again downwardly through the catalyst 23a with which the spaces 20a between said tubes 13a are filled.

The apparatus shown diagrammatically in Fig. 3 and in detail in Fig. 8 comprises a combined converter and heat exchanger consisting of a closed chamber or vessel 10b in which a closed shell 11c is located, said shell 11c being provided at its upper end with a plurality of converter tubes 13b having their opposite ends fixed respectively in heads 14b and 15b, said tubes 13b being arranged in spaced relation; the spaces 20b between said tubes contain the catalyst 23b which, as in the previous forms, may rest upon a carrier 21b provided with perforations 22b. The head 14b is perforated and is spaced from the upper end of the shell 11c to form a chamber 16b as shown in Fig. 8. Below the shell 11c is located a heat exchanger shell 24 provided with heads 25 and 26 in which the opposite ends of heat exchanger tubes 27 are located, the tubes 27 communicating at their opposite ends respectively with chambers 28 and 29, the first of which is connected by means of a passage 30 with the interior of the shell 11c and the second of which communicates with the gas outlet 19b. The tubes 13b at their lower ends communicate with a chamber 13c which, in turn, is connected by passages 31 with the interior of the heat exchanger shell 24. The shells 24 and 11c are contained within a closed secondary shell 32 which divides the space between the shells 24, 11c, and the vessel 10b into two adjacent outer and inner passages 12c and 12d extending lengthwise of the chamber 10b and the two shells 11c and 24. The passage 12c at its lower end communicates with the gas inlet 18b by means of perforations 33 formed in the shell 32 below the bottom thereof as shown in Fig. 8 while the passage 12d is in communication with the interior of the shell 24 through the medium of apertures 34 located at the lower end of said shell 24. At its upper end the passage 12c communicates with a continuing passage 12e and with a sleeve 35 which, in turn, is connected with the passage 12d by means of a chamber 36. If desired the apparatus may include a secondary gas inlet 18d for use in starting the apparatus.

The method of producing ammonia in which the apparatus shown diagrammatically in Fig. 3 and more completely in Fig. 8, may be utilized, consists in passing the synthesis gas from the inlet 18b through the apertures 33 into the passage 12c in which said gases flow upwardly into the channel 12e and then downwardly in the sleeve 35 and into the chamber 36. From the latter said gases pass downwardly in the channel 12d until the apertures 34 are reached through which said gases pass into the interior of the heat exchanger shell 24 and rise upwardly therein in the spaces between the tubes 27. From the interior of the shell 24 said gases flow through the passages 31 into the chamber 13c and then upwardly in tubes 13b to the chamber 16b. From the latter said gases pass downwardly through the apertured head 14b and through the catalyst 23b contained in the spaces 20b between the tubes 13b. After having passed through said catalyst 23b the gases flow through the apertures 22b of the carrier 21b and downwardly through the channel 30 into the chamber 28 from which said gases pass downwardly through the heat exchanger tubes 27. After leaving the latter said gases flow from the chamber 29 through the gas outlet 19b for further treatment in the synthetic production of ammonia.

The apparatus shown diagrammatically in Fig. 4 differs from that shown in Figs. 3 and 8 in that instead of having independent sets of tubes 13b and 27 for the converter and heat exchanger respectively, the tubes are continuous throughout their entire length and comprise converter portions 13d and heat exchanger portions 27a as clearly shown in said Fig. 4.

In this form of apparatus the gases enter at 18c and pass upwardly in the passage 12c and then downwardly in the passage 12d and upwardly in the combined tubes 27a and 13d. After leaving the upper ends of the latter the gases pass downwardly through the catalyst 23b into the spaces between the tubes 27a and out through the outlet 19c. It will be noted that in the apparatus shown diagrammatically in Fig. 4 the gas flow in the heat exchanger portion of the apparatus is reversed with respect to the flow of the gas in the corresponding portion of the apparatus shown in Figs. 3 and 8, otherwise the two forms of apparatus operate in approximately the same way.

It will be noted that in the methods and apparatus described the gas is passed in one direction through the tubes and in the opposite direction through the catalyst. In practise the particular direction of flow may be selected at will. In each case and irrespective of the direction of the flow of gas the catalyst is located outside of said tubes instead of inside the same as has been the general practise; furthermore (except in Fig. 1) the wall of the converter is protected against over-heating by passing all of the incoming gas in contact therewith. It will be observed that the catalysis gas in traversing the converter is first divided into a plurality of separated gas streams and that these thus isolated streams pass through a united mass of catalyst. Inasmuch as the particles of catalytic material are contiguous and are ready conductors of heat, heat developed at any point will be distributed more or less uniformly throughout the united mass of catalyst, thereby affording a relatively uniform opportunity for the separated gas streams to take up heat. The walls of the gas passages through the united mass of catalyst being composed of heat transmitting material, it is apparent that a portion of the heat of reaction developed at any part of the catalyst will be transferred to the gas flowing through the gas passages. The gas that flows through the catalyst in direct contact therewith flows as an integral mass or stream and no longer as separated or isolated streams, a merger of the isolated streams being permitted prior to the point where the gas first contacts with the catalytic material. In other words, the gas, while penetrating the catalyst without direct contact therewith, is in the form of numerous isolated streams, but on coming into contact with the catalyst, is in the form of a single consolidated stream or integral mass. These arrangements provide a maximum ammonia output by having a maximum charge of catalyst from which, at the same time, heat of reaction evolved during the passage of the gas through the catalyst is efficiently removed so that the required temperature is obtained and maintained throughout the catalyst charge; further, by means of these arrangements, the heat of reaction so removed from the catalyst, is utilized by being transferred to the fresh gas, whereby its final preheating temperature is brought to the desired value. By placing the catalyst outside of the tubes the amount of the catalyst charge may be increased. The maximum relation between the volumes inside the tubes and outside the tubes is determined by the amount of solid supporting material required in the supporting heads and by the space taken up by the material constituting the tube walls. This maximum relation is such that the space inside the tubes is less than the space outside of the tubes. Consequently when an apparatus is arranged for such maximum relation, no increase could be obtained by simply increasing the number of the catalyst containing tubes, because by increasing the number of tubes the distance between them and therefore the amount of solid supporting material in the tube heads, is decreased and consequently weakened. If, on the other hand, said tubes be increased in number but decreased in size, the cross-sectional area of the walls of the tubes themselves increases relatively to the cross-sectional area of the free space within said tubes. In other words, so long as the catalyst is contained in the tubes, no substantial benefit not counteracted by a corresponding defect can be obtained by either increasing or decreasing either the size or the number of the tubes. By placing the catalyst outside of the tubes and passing the gas through the latter, not only is the amount of catalyst increased but other advantages result. The increase in the amount of catalyst increases product provided the excess heat evolved is removed. By passing the incoming gases not through the larger space between the tubes but through the relatively much restricted passages through the tubes themselves, the velocity of those gases is correspondingly increased and therefore the increased heat evolution due to increase of catalyst is automatically taken care of since the transfer of heat varies almost directly with the velocity of the gas. This principle can be applied to still greater advantage by decreasing the size of the tubes, whereby the velocity of the gases is still further increased and added space for still more catalyst is afforded. However, by also increasing the number of such smaller tubes (within the limits of a proper gas velocity through all of them) the average and maximum distance between the catalyst particles and the heat removing gas flow is decreased and the heat exchange is more uniform throughout an entire cross-section. This means a greater uniformity of catalyst temperature throughout such cross-section. If desired, the velocity of the fresh gas may be still further increased by locating core-rods $h$ (see Fig. 8) within the tubes 13b and 27. With this arrangement the gas must flow through the relatively small annular space between the core-rods and the tube walls whereby its velocity and consequently the heat transfer is further increased. By proceeding in the described manner, and bearing in mind that the incoming gas stream immediately prior to its introduction to direct contact with the catalyst has been brought to a temperature approximating the reacting temperature in the catalytic material, it will be apparent that the initiation of the reaction in the catalytic material will occur almost immediately after the gases make their first direct contact with the catalytic material so that a high temperature zone favorable to the initial stages of the catalytic reaction is established near the region where the gases make their first contact with the catalyst. The high temperature zone is definitely maintained near the inlet end of the catalytic material by passing the incoming preheated gas through tubes surrounded by the body of the catalytic material in the reverse direction to the subsequent passage of the gas through the catalyst without sacrifice (notwithstanding the increased heat-transfer efficiency of the new process) of the temperature conditions in the catalyst necessary to maintain the autothermic continuity of the process. At the same time the increased heat transfer efficiency of the new process causes a relatively rapid increase in temperature in the gas flowing through the tubes, thereby increasing the rapidity with which the temperature decreases in the catalyst between the zone of highest heat heretofore described and the outlet end of the catalyst. In other words, the temperature gradient within the catalytic body would be represented by a curve which rises very sharply and quickly to a maximum and then descends to effect a substantial fall in temperature, the highest point of the curve being represented by a region of the catalyst located near the entrance end of the catalytic material.

With the illustrated and described methods and apparatus the catalyst charge and the ammonia output in an apparatus of a given size is increased. The heat transfer efficiency is increased and the increased evolution of heat, due to the increased ammonia output, is coincidentally removed from the catalyst in such a way that the temperature of a cross-section of the catalyst charge as a whole is maintained at a substantially uniform point. Furthermore, the improved apparatus includes cooling of the converter walls in the sense that high temperature heat which would otherwise reach the walls is transferred to the incoming fresh gas and thus utilized.

In Figs. 7 and 8 the parts indicated as 37 are spacers preferably of the character and arrangement shown in my United States Patent No. 1,649,120 for Improvements in heat exchangers— 38 (Fig. 8) are baffles to cause the gas to travel in a sinuous direction around the tubes 27.

It will be understood that the passages through which the gas, after passing the catalyst proper, flows to the ammonia condensers (or other apparatus) may contain catalyst material or material which is preferably a good conductor of heat and that such passages may be located either within the same shell as that which encloses the catalyst proper or in an independent container.

It will be observed that while in the process described, the reaction between nitrogen and hydrogen to form ammonia in the presence of a catalyst, is exothermic from a chemical point of view, the amount of heat so developed or evolved is comparatively small in relation to that required to heat the gas passing into contact with the catalyst to a temperature at which the reaction takes place. As a result it was necessary to use auxiliary heating instrumentalities or, in order to make the process thermally self-sustaining, it was necessary to efficiency transfer the heat in the gases leaving the catalyst to the gases on their way to the catalyst. But the problem is not merely one of efficient heat transfer. The range of temperatures at which an ammonia catalyst is active is comparatively restricted and specific for each catalyst type. If the temperature is a little too low, the formation of ammonia is slow and incomplete. Again, if the temperature rises a relatively small amount above the proper operating temperature the reaction is inhibited and in many cases the catalytic activity of the catalyst material is permanently impaired. Not only, therefore, must there be an efficient transfer of heat in order to make the reaction thermally self-sustaining, but there must be at the same time a positive and sensitive control of the catalyst temperature to prevent the temperature from varying outside of the restricted range within which the operation must be conducted for satisfactory commercial results. This problem is not met with in processes of the contact sulfuric type. In processes of that type there is a large amount of heat liberated by the chemical reaction and it is a relatively simple matter to transfer heat to the incoming gases in sufficient amount to maintain the reaction temperatures. Nor is it of such prime importance that the temperature of the catalyst be controlled within a very restricted range of temperatures. Applicant has found that the control of the heating of the gases passing to the catalyst and the delicate temperature balance in the catalyst material characteristic of a catalytic reaction of the ammonia type are obtained in a very efficient manner by the arrangement whereby the catalyst material is disposed in the space around the tubes and the gases passed through those tubes and then into contact with the catalyst, as contrasted with placing the catalyst material inside of tubes and causing the gases to be catalyzed to circulate around the tubes before making catalytic contact with the catalyst.

There are other conditions peculiar to the ammonia reaction and which distinguish it from the catalytic production of sulfuric anhydride. The reaction is not carried out at ordinary pressure but at relatively high pressures. The gases, nitrogen, hydrogen, and ammonia, at the temperatures and pressures required for efficient operation have a tendency to attack the material of which the apparatus is composed so that special precautions are necessary for the protection of the pressure sustaining walls of the apparatus.

Various changes in the specific form shown and described may be made within the scope of the claims without departing from the spirit of my invention.

I claim:

1. That improvement in the synthetic production of ammonia, which comprises passing hydrogen-nitrogen synthesis gas under pressure into a chamber and within said chamber causing said gas first to pass lengthwise thereof through a passage situated in the space located between the inner wall of said chamber and the outer wall of the catalyst container, then causing the gas to travel in one direction as a plurality of individually isolated gas streams flowing through a body constituting a united mass of catalyst in direct heat-exchange relation, but out of contact therewith and then merging the isolated streams and immediately passing the merged gas streams as an integral stream in the opposite direction through and in actual contact with the united mass of catalyst and withdrawing the product from the chamber.

2. That improvement in the synthetic production of ammonia, wherein the ammonia catalysis is conducted under pressure in a pressure-resisting chamber, which consists in passing compressed synthesis gas to the interior of the chamber, and, in said chamber, passing it lengthwise and adjacent to the pressure-resisting walls thereof, then causing the gas to travel in one direction as a plurality of individually isolated gas streams flowing through a united mass of catalyst in direct heat-removing relation but out of contact therewith and so as to be thermally effective throughout the cross sections of the interior body of catalyst, and then merging the isolated gas streams and passing the merged gas streams as an integral mass in the opposite direction through and in actual contact with the united mass of catalyst in heat-transmitting relation with the said isolated gas streams whereby a portion of the heat of reaction developed at any part of the united mass of catalyst, will be transferred to gas in the isolated gas streams.

3. The improvement in the synthetic ammonia art wherein the ammonia catalysis is conducted under pressure in a pressure-resisting chamber, which consists in passing compressed synthesis gas to the interior of the chamber, passing it lengthwise thereof as a stream, portions of which flow in opposite directions and adjacent to each other, one of said portions flowing next to the pressure-resisting wall, then causing the gas to travel in one direction in a plurality of individually isolated gas streams, flowing through a united mass of catalyst in direct heat-removing relation but out of contact therewith said heat-removing relation being effective throughout the cross-sections of the interior body of catalyst, merging the isolated gas streams, and then passing the merged stream as an integral mass in the opposite direction through and in actual contact with the united mass of catalyst in heat-transmitting relation with the said isolated gas streams, whereby a portion of the heat of reaction developed at any part of the united mass of catalyst, will be transferred to gas in the isolated gas streams.

4. An apparatus for catalytic reactions of the ammonia type comprising a pressure chamber, a shell within said chamber and spaced therefrom to form a passageway, a plurality of tubes within the shell so spaced as to provide heat-removing means effective throughout the cross-sections of the interior body of the catalytic material in said shell, a mass of catalytic material thermally associated throughout by physical contact between adjacent particles constituting the mass and located in the spaces between said tubes and surrounding the same, and connections positioned to direct catalysis gas when passing through said apparatus, to flow lengthwise of said passageway, then in one direction through said tubes as a plurality of gas streams isolated from each other by said tubes and then in the opposite direction, as one mass of gas, through and in contact with the catalytic material but out of contact with the walls of the pressure chamber first mentioned.

5. An apparatus for catalytic reactions of the ammonia type comprising a pressure chamber, a shell within said chamber and spaced therefrom to form a passage-way, a plurality of tubes within the shell so spaced as to provide heat-removing means effective throughout the cross-sections of the interior body of the catalytic material in said shell, means for causing an increase of speed of the flow of gas through the tubes, a mass of catalytic material thermally associated throughout by physical contact between adjacent particles constituting the mass and located in the spaces between said tubes and surrounding the same, and connections positioned to direct catalysis gas when passing through said apparatus, to flow lengthwise of said passage-way, then in one direction through said tubes as a plurality of gas streams isolated from each other by said tubes and then in the opposite direction, as one mass of gas, through and in contact with the catalytic material, but out of contact with the walls of the pressure chamber first mentioned.

6. An apparatus for catalytic reactions of the ammonia type comprising a pressure chamber, insulating means for the chamber, means to introduce cooling fluid between said insulating means and the chamber to reduce excessive temperatures of the chamber, a shell within said chamber and spaced therefrom to form a passage-way, a plurality of tubes within the shell so spaced as to provide heat-removing means effective throughout the cross-sections of the interior body of the catalytic material in said shell, a mass of catalytic material thermally associated throughout by physical contact between adjacent particles constituting the mass and located in the spaces between said tubes and surrounding the same, and connections positioned to direct catalysis gas when passing through said apparatus, to flow lengthwise of said passage-way, then in one direction through said tubes as a plurality of gas streams isolated from each other by said tubes and then in the opposite direction, as one mass of gas, through and in contact with the catalytic material, but out of contact with the walls of the pressure chamber first mentioned.

7. An apparatus for catalytic reactions of the ammonia type comprising a pressure chamber, a shell within said chamber and spaced therefrom, an auxiliary casing located in the space between said shell and chamber and forming a double, connected, passage-way, each member thereof extending lengthwise of said chamber, a plurality of tubes within the shell so spaced as to provide heat-removing means effective throughout the cross-sections of the interior body of the catalytic material in said shell, a mass of catalytic material thermally associated throughout by physical contact between adjacent particles constituting the mass and located in the spaces between said tubes and surrounding the same, and connections positioned to direct catalysis gas when passing through said apparatus, to flow lengthwise of said passage-way, then in one direction through said tubes as a plurality of gas streams isolated from each other by said tubes, and then in the opposite direction, as one mass of gas, through and in contact with the catalytic material, but out of contact with the walls of the pressure chamber first mentioned.

8. An apparatus for catalytic reactions of the ammonia type comprising a pressure chamber, a converter located within said chamber and interiorly spaced therefrom, a heat-exchanger associated with said chamber and connected with said converter, an auxiliary shell enclosing said converter and heat-exchanger and dividing the space between the same and said chamber into adjacent outer and inner passage-ways connected with each other and with said heat-exchanger, and connections positioned to direct catalysis gas when passing through said apparatus, to flow lengthwise of said passage-ways in opposite directions, then through said heat-exchanger and converter successively and then in an opposite direction through said converter and heat-exchanger successively.

9. An apparatus for catalytic reactions of the ammonia type comprising a pressure chamber, a main shell located within said chamber and exteriorly spaced therefrom, a plurality of tubes extending lengthwise of said main shell and so spaced as to provide heat-removing means effective throughout the cross-sections of the interior body of the catalytic material in said shell, a mass of catalytic material thermally associated throughout the mass by physical contact between adjacent particles constituting the mass and located in the spaces between said tubes and surrounding the major lengths thereof, a secondary shell enclosing said main shell and dividing the space between the latter and said chamber into adjacent outer and inner passage-ways connected with each other, and connections positioned to direct catalysis gas when passing through said apparatus, to flow lengthwise of said passage-ways in opposite directions, then through said tubes as a plurality of gas streams isolated from each other by said tubes and then in the opposite direction, as one mass of gas, through and in contact with the catalytic material but out of contact with the walls of the pressure chamber first mentioned, and then through the spaces between the minor portions of said tubes which are not surrounded by catalytic material.

WALTER H. KNISKERN.